Aug. 8, 1939.  E. H. THOMAS  2,168,889
METHOD AND APPARATUS FOR EXTRUDING MATERIALS
Filed Sept. 2, 1936
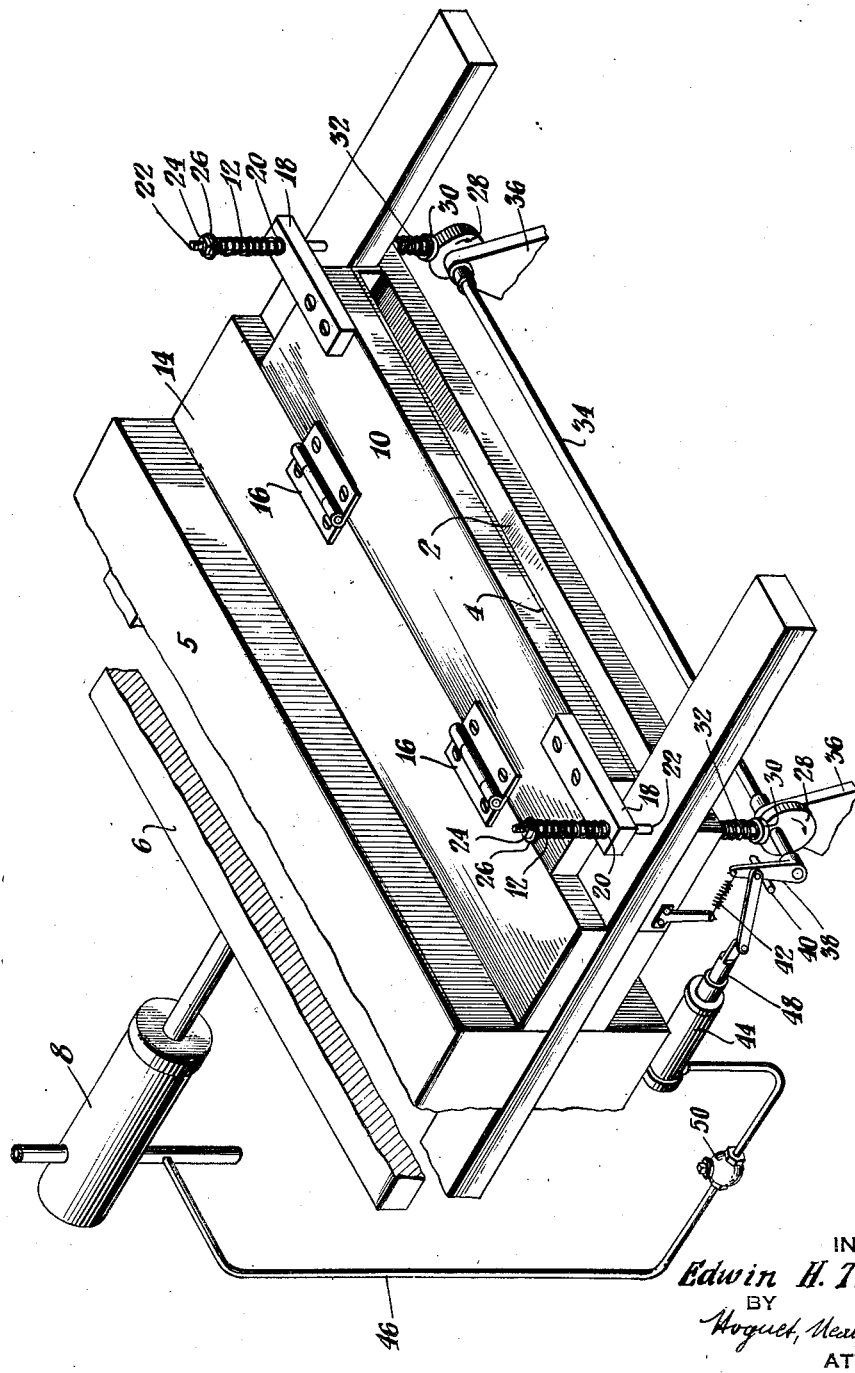
INVENTOR
Edwin H. Thomas
BY
Hoguet, Neavy & Campbell
ATTORNEYS Patented Aug. 8, 1939

2,168,889

UNITED STATES PATENT OFFICE 2,168,889

METHOD AND APPARATUS FOR EXTRUDING MATERIALS

Edwin H. Thomas, Newark, Del., assignor to Bond Manufacturing Corporation, Inc., a corporation of Delaware Application September 2, 1936, Serial No. 99,102

13 Claims. (Cl. 18—12)

This invention relates to method and apparatus for forming materials by extrusion and while the invention is of general application, it is particularly adapted for use in forming articles from comminuted material and a binder.

In accordance with the present invention, means are provided which operate automatically to vary the resistance presented to the material in its movement through an extrusion passage, so that the pressure applied to the material may be maintained substantially uniform without adjustment or attention during an extrusion operation. Constructions embodying the present invention are also adjustable to permit the use thereof with materials of different composition or consistency to cause the material to undergo any desired degree of compression.

In that form of the invention illustrated in the drawing and hereinafter described, the automatic control of the mechanism is effected by varying the cross-sectional area of a portion of the extrusion passage in response to change in the amount of force required for actuating the piston or other means employed for forcing the material through the passage.

One of the objects of the present invention is to provide a method and an improved form of extrusion device for automatically maintaining the resistance to movement of material through an extrusion passage substantially constant.

Another object of the invention is to provide apparatus adapted for use in the extrusion of materials of widely different character.

A further object of the invention is automatically to maintain balanced resistance to movement of material through an extrusion passage so that a change in such resistance in one part of said passage may be compensated by a corresponding change in resistance in another part of said passage.

These and other objects and features of the invention will appear from the following description thereof in which reference is made to the accompanying figure of the drawing which is a part perspective and part diagrammatic representation of an embodiment of the invention as adapted for use in producing sheets formed from comminuted cork and a binder and intended to be associated with a known form of extrusion apparatus, the conventional elements of which are omitted from the drawing.

In that form of the invention chosen for purposes of illustration the mechanism embodies an extrusion passage or tube 2 formed with an inner surface of suitable material such as sheet metal with the upper surface 4 of the tube adjacent the free end thereof sufficiently flexible so that it may be moved with respect to the other walls of the extrusion passage. The material to be extruded is introduced into the extrusion passage at a point in advance of the heating or cooking zone 5 (shown in part) by any suitable mechanism (not shown) and is forced through the passage by means of a plunger 6 which in the construction illustrated is actuated by hydraulic means including the cylinder 8. As illustrated the invention is intended to be applied in an extrusion apparatus of the general type disclosed in U. S. Patent No. 1,453,617, dated May 1, 1923.

The free end of the passage is provided with a member 10 which bears against the flexible portion 4 in the upper wall of the extrusion passage and suitable means, shown in the drawing as springs 12, are provided for urging the member 10 downwardly against the material being extruded as it approaches the free end of the passage and after it has passed the heating zone 5. The member 10 is movable with respect to adjacent portions of the apparatus and may be pivotally secured to the frame 14 surrounding the passage 2 by means of hinges 16 or otherwise. The member 10 is provided with projections 18 having openings 20 therein through which pass rods 22, the upper ends of which are threaded to receive nuts 24 and washers 26. The upper ends of springs 12 bear against the washers 26 while the lower ends of the springs bear against the projections 18 to urge the member 10 downward. The force exerted by the springs 12 in urging the member 10 downward may be varied by adjustment of the nuts 24 so that the resistance to extrusion of material due to flexing of the portion 4 of the tube may be readily adjusted.

In order that operation of the mechanism may be controlled automatically during the extrusion operation to produce a uniform product despite changes in operating conditions or in the composition of the product the mechanism may be provided with further means for regulating the force with which the springs 12 urge the member 10 and the flexible portion 4 of the extrusion passage downwardly against the material being extruded through the passage. In the construction illustrated such automatic means are in the form of eccentric members 28 against which bear the followers 30 on the lower ends of the rods 22 about which the springs 12 are located. Springs 32 which are stronger than the springs 12 urge the rods 22 downwardly against the action of the springs 12 so that the followers 30 are continuously urged against the eccentrics 28. The eccentrics are secured to shaft 34 mounted in supports 36 and provided with a crank 38 for rotating the shaft. The crank is urged toward a stop 40 by spring 42 to maintain the eccentrics in the position shown in which the rods 22 are in their lowermost positions and springs 12 compressed to urge the member 10 forcibly downward. Rotation of the eccentrics in the direction of the arrows by movement of the crank 38 away from stop 40 serves to raise the rods 22 and thus decrease the force with which the springs 12 urge the member 10 and the flexible portion 4 of the passage 2 downwardly. In this way the resistance to movement of the material through the extrusion passage is varied by movement of the crank 38.

The operation of the crank 38 to alter the resistance to extrusion of material may be effected by any suitable means. As shown in the drawing the means employed may include a hydraulic cylinder 44 connected by a suitable conduit 46 to the cylinder 8 which actuates the plunger 6. The pressure applied to the liquid or fluid employed for actuating the plunger will thus be transmitted to the cylinder 44 to urge the piston 48 thereof outwardly against the action of spring 42 to rotate the eccentrics and raise the rods 22. The force exerted by the springs 12 in urging the member 10 and flexible portion 4 of the extrusion tube downward is balanced in this way to compensate for variations in the resistance to movement of the material through the passage 2. Suitable means such as an adjustable check valve 50 may be located in the conduit 46 to cause the piston 48 to be actuated only after a predetermined pressure has been built up in the cylinder 8 for operating the piston 6. By adjustment of the check valve and adjustment of the nuts 24 on rods 22 the tension on springs 12 and the operation of the piston 48 can be varied as desired.

In this way it is possible to produce products varying in density from similar compositions or to produce products of similar density from compositions which vary considerably in character. The mechanism is thus adapted for use with a wide variety of compositions and materials and may be adjusted very readily to obtain the desired compression and density of the material being handled.

With the construction described when employing automatic means for varying the force with which the member 10 is urged downwardly the resistance to movement of the material through the extrusion passage 2 is maintained substantially constant and is responsive to variations in the force required to actuate the plunger 6. When the frictional resistance to movement of the material through the passage is relatively low the springs 12 exert their maximum force in urging the member 10 against the flexible portion 4 of the extrusion passage thereby imposing the maximum frictional resistance between the portion 4 of the tube and the material being extruded. The pressure applied to the liquid in cylinder 8 is then relatively low and is insufficient to actuate the plunger 48 so that the eccentrics 28 remain in the position indicated in the drawing. In the event the force required to operate the plunger to advance the material through the tube should increase the hydraulic pressure that must be applied in the cylinder 8 to actuate the plunger 6 is increased until it overcomes the resistance of check valve 50 and liquid passes to the cylinder 44 to actuate the crank 38. The eccentrics 28 are then rotated to raise the rods 22 decreasing the force with which the springs 12 urge the member 10 downward and decreasing the resistance offered by the portion 4 to the movement of material through the passage. The balance in resistance between that presented by the main portion of the tube and that presented by the flexible portion 4 thereof thus insures the maintenance of a constant total resistance and uniform compression of the material extruded. Substantially constant conditions of operation are thus maintained automatically and the density of the resulting product is maintained uniform.

The form and construction of the extrusion passage and the mechanism employed in the practice of the invention will of course vary with the nature of the product to be produced. Sheets, rods, cylinders and other forms of extruded products may be produced in accordance with the present invention by suitable variations in the form and construction of the elements of the mechanism used and therefore it should be understood that the form of the apparatus herein shown and described is intended to be illustrative of a typical embodiment of the invention and is not intended to limit the scope thereof.

I claim:

1. Apparatus for extruding material comprising means defining a passage through which the material is extruded, means for presenting variable frictional resistance to movement of material through said passage, power means for forcing material through said passage and control means operatively connecting said power means and said friction presenting means for varying the amount of frictional resistance presented by said friction presenting means in response to the variations in the force required to actuate said power means.

2. Apparatus for extruding material comprising means defining a passage having an outlet opening through which the material is extruded, means for forcing material through said passage, movable means engaging material being forced through said passage, yieldable means normally urging said movable means against material in said passage to resist movement thereof and means acting against said yieldable means and operatively connected to said forcing means for varying friction between said material and said movable means.

3. Apparatus for forming sheet material from comminuted material and a binder comprising a relatively wide flat tube at least a portion of one side of which is flexible, a movable member bearing against said flexible portion, means urging said member against said portion, and mechanism operable in response to variation in the total resistance to movement of material through the passage to vary the force with which said member is urged against said portion.

4. Apparatus for forming sheet material from comminuted material and a binder comprising a relatively wide flat tube at least a portion of one side of which is flexible, a movable member bearing against said flexible portion, spring means urging said member against said portion and hydraulic means responsive to variations in the resistance to movement of material through said tube acting against said spring means to maintain the resistance to movement of material through said tube substantially uniform.

5. Apparatus for extruding material comprising means defining a passage, a plunger for forcing material through said passage, a movable member engaging the material being extruded, a control device urging said member against said material to resist movement thereof through said passage, fluid operated means for actuating said plunger, a second fluid operated means for actuating said controlling device, and means providing a common source of fluid under pressure for supplying fluid to each of said fluid operated means.

6. Apparatus for extruding material comprising means defining a passage through which the material is passed to form the same into a predetermined shape, a plunger for forcing material through said passage, actuating means for said plunger and means for maintaining substantially uniform resistance to the movement of material through said passage including a member yieldably engaging said material and means responsive to variations in the force applied to said plunger to advance material through said passage for altering the pressure exerted by said member against the material moving through said passage.

7. Apparatus for extruding material comprising means defining a passage through which material is passed, a plunger for moving material through said passage, a movable member tending to restrict the cross sectional area of at least a part of said passage, a control device acting against said member, means for forcibly actuating said plunger and an operative connection between said means and control device for varying the movement of said member in response to variations in the force exerted by said means in actuating said plunger.

8. Apparatus for extruding materials to form the same comprising means defining a passage through which the material is forced, means for forcing material through said passage, restricting means for varying the cross sectional area of said passage, yieldable means urging said restricting means in a passage restricting direction and means responsive to variations in the force required to move the material through said passage for opposing the action of said yieldable means and movable in the opposite direction for varying the force with which said yieldable means urges said restricting means in said passage restricting direction.

9. Apparatus for forming sheet material from comminuted material and a binder comprising a relatively wide flat tube at least a portion of one side of which is flexible, a movable member bearing against said flexible portion, spring means urging said member against said portion and means responsive to variations in the resistance to movement of material through said tube acting against said spring means to maintain the resistance to movement of material through said tube substantially uniform.

10. Apparatus for extruding material, comprising means defining a passage having an outlet opening through which the material is extruded, said means including a flexible portion, a movable member bearing against said flexible portion to reduce the cross-sectional area of said passage, a spring urging said movable member against said portion, and means responsive to variations in the resistance to movement of material through said passage acting against said spring to maintain the resistance to movement of material through said passage uniform.

11. A method of forming articles from moldable material comprising the steps of forcing the moldable material longitudinally through a shape forming passage, applying a yieldable force to said material in a direction transversely of said passage as the material is forced therethrough, and varying said yieldable force in response to variations in the total resistance to longitudinal movement of the material through said passage.

12. A method of forming articles by forcing material through a forming passage having a portion of the walls thereof movable relative to another portion of said walls to vary the cross sectional area of said passage, which comprises the steps of forcing material longitudinally through said passage, forcing said movable wall portion inwardly toward another wall portion to limit the cross sectional area of said passage and varying the force applied to said movable wall portion in accordance with the force applied to said material to move the same longitudinally through said passage.

13. A method of forming articles from moldable material comprising the steps of forcing the moldable material longitudinally through a shape forming passage, applying a force to said material in a direction transversely of said passage as the material is forced therethrough, and varying said transversely directed force in response to variations in the total resistance to longitudinal movement of the material through said passage.

EDWIN H. THOMAS.